United States Patent Office 2,973,599
Patented Mar. 7, 1961

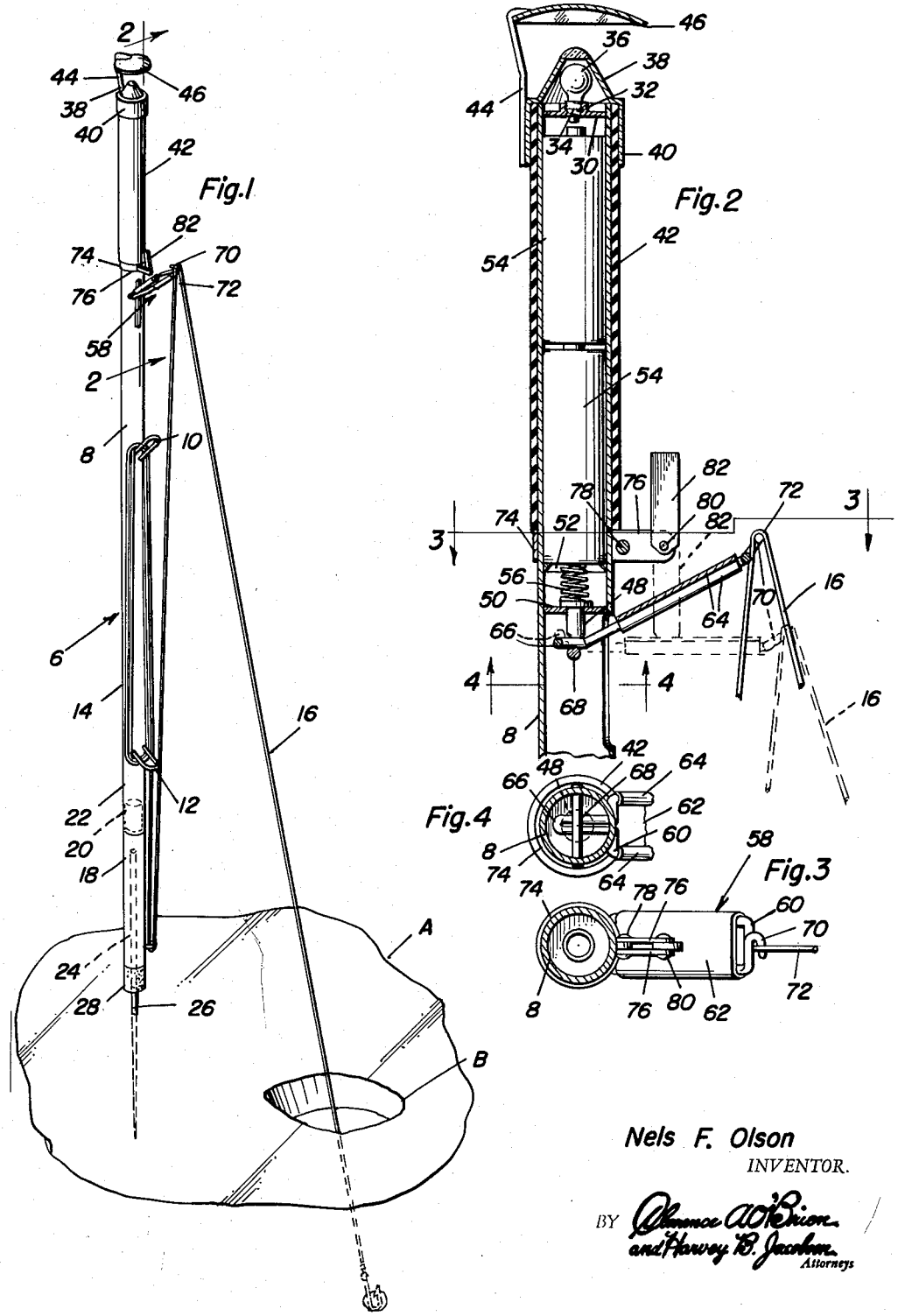

2,973,599

SIGNAL-EQUIPPED FISHING POLE

Nels F. Olson, 3255 35th Ave. S., Minneapolis, Minn.

Filed Sept. 19, 1958, Ser. No. 762,006

3 Claims. (Cl. 43—17)

This invention relates to an improved fishing pole which is expressly adapted for night fishing and also when ice fishing.

In carrying out a preferred embodiment of the invention an elongated light weight tube or barrel has a dowel plugged into the lower end, said dowel being provided with a pointed embedded prong permitting the lower end of the thus constructed pole to be anchored in the ice adjacent the fishing hole in the ice. Suitable means is also provided on the median portion of the pole to facilitate wrapping or winding surplus portions of the fishing line thereon when said portions are not in use.

The invention also features a grip of rubber or the like on the upper end of the pole which enables the pole to be used as a stick and also as a flashlight. That is to say, this upper end portion of the tube is equipped with dry-cell batteries and a flashlight and also with a reflector.

The invention in addition to providing a long-handled flashlight with a reflector, as it were, also has a bite actuated trigger thereon which is cooperable with a simple switch in a manner to use the flashlight as a night signal when a strike has been had.

Then, too, novelty is predicated on the trigger which is pivotally mounted and has means for releasable attachment of the fishing line thereto and wherein a retainer is provided to keep the switch on for a prolonged period of time, particularly when the device is being used as a long handled flashlight for assistance in baiting one's lines and attending to other fishing chores requiring the use of the ordinary type flashlight.

Other objects, features and advantages will become more readily apparent from the following description and the accompanying drawing.

In the drawing, wherein like numerals are employed to designate like parts throughout the views:

Fig. 1 is a perspective view showing the fishing rod or pole with signal and illustrating how it is used when night fishing on ice.

Fig. 2 is an enlarged fragmentary view with parts in section and elevation taken on the vertical line 2—2 of Fig. 1.

Figs. 3 and 4 are cross-sections on the lines 3—3 and 4—4, respectively, of Fig. 2.

With reference now to Fig. 1 the letter A designates the ice and B the fishing hole in the ice.

The multi-part pole or rod is denoted, as an entity, by the numeral 6 and comprises, as before stated, an elongated barrel or tube 8 provided on one side and between its respective ends by suitable cleats or the like 10 and 12 to permit one to wind the unused portion 14 of the fishing line 16 therearound, permitting it to be stored in a well-known manner. The aforementioned wooden or equivalent dowel 18 has a reduced upper end 20 which is plugged into the lower end portion 22 of the tube. This dowel has the shank portion 24 of a pointed prong or spike 26 anchored therein and reinforced and partly held by a suitable ferrule or the like 28. Thus the lower end portion of the tube is provided with a spike which may be driven and anchored in the ice adjacent to the hole B to support the pole in an upright fishing position. A spider or the like 30 is mounted in the upper portion of the tube as seen in Fig. 2 and provided with a screw-threaded collar 32 supporting the screw base 34 of the lamp bulb 36. This bulb is housed in a protective transparent cap 38 having a rim portion or collar 40 snugly surrounding and fitted over the upper end portion of a rubber hand-grip 42. The collar is provided with a lateral arm 44 equipped with a properly positioned reflector 46. The reflector is in focal alignment with the bulb. Thus with this construction the upper end of the rod has suitable hand-grip and flashlight embodied therein. This flashlight may be used with the tube or barrel serving as a long handle therefor. One often desires to use a long handled flashlight when looking around for accessories and things in general on the ice around the fishing hole and this type of a flashlight construction is therefore believed to be an innovation.

Attention is directed to a push-button 48 which is shown in Figure 2 as slidingly mounted in an opening provided therefor in a partition 50 fixed in the barrel below the support ring 52 for the lower one of the dry cells or batteries 54. The button acting in conjunction with a coil spring 56, switches the flashlight off and on. Mechanical means is provided for operating the button and this means comprises what is broadly referred to as a bite actuated trigger 58. The trigger (Fig. 3) comprises a generally rectangular or equivalent wire frame 60 and a sheet metal plate 62 which is mounted thereon and has its edge portions rolled around the limbs of the frame as shown at 64. Actually one end portion of this wire frame is doubled upon itself into general U-shape form as seen at 66 in Fig. 4 and this portion provides a trip and is welded or otherwise fixed to a cross pin 68 journalled in bearings and providing a hinge mounting for the trigger. The outer end portion of the trigger is provided with a suitably arranged and shaped hook 70 with which the releasable portion 72 of the baited fishing line 16 is connected in the manner shown. With this arrangement the line may be quickly detached from the trigger and the fish played in hand-line fashion as is well-known to ice fishermen.

When the trigger 58 is tripped to assume the dotted line position shown the trip 66 acts on the button 48 and spring 56 compressing the spring. Thus, the dry cells or batteries are slid in the hand grip and the gap between the contacts 34 is closed and the lamp is lighted in an obvious manner. Of course, when the trigger is in the full line position shown, the spring 56 will have exerted a spring biasing action upon the button and the button 48 will press the trigger to the slanting ready-to-act position shown.

Attention is directed to a collar-like or split clamp 74 which embraces the tube or barrel 8 just below the hand-grip. This collar has projecting end portions 76 riveted or otherwise secured together in close relationship at 78. The extending end portions are provided with a rivet or the like 80 providing a pivot pin for a retaining latch 82. This latch is normally up and out of the way and does not interfere with the operation of the signalling trigger and line. When however, it is swung down to the phantom line position it has its free or lower end pressing against the plate portion and this action forces the trigger down and closes the circuit and keeps the flashlight on. In other words, there are periods when one desires to keep the flashlight on steady instead of merely using it as an intermittent signalling device. This latch and clamp which function to hold the trigger down, makes this "on" operation of the flashlight practical.

It is believed that it is not inappropriate to refer to the invention in a sense that it is also a tip-up for daytime fishing. In other words, the light is not always necessary. However, when a bite is had and the trigger goes down or moves up and down as it would by way of the resilient pressure of the switch button 48 against the pivoted end and a signalling device for daytime fishing is had.

Minor changes in shape, size, materials, and rearrangement of component parts may be resorted to in actual practice without departing from the spirit of the invention or the scope of the invention as claimed.

What is claimed as new is as follows:

1. An illuminable bite controlled fishing device for night fishing comprising an elongated hollow pole having means whereby the lower end thereof may be anchored removably on ice adjacent a hole in the ice, a flashlight built into the upper end of said pole and having a reflector cooperable therewith to reflect light rays when the flashlight is in use down and upon the surface of the ice, said flashlight having switch means incorporated in said pole, and a trigger having an end portion pivotally mounted in the pole and engaging said switch means, said trigger projecting outwardly beyond the pole and including at an outer end thereof a hook to which a portion of a fishing line may be releasably connected.

2. The structure defined in claim 1 and wherein said trigger is provided with a plate portion, and a collar mounted on said pole and provided with a pivoted downwardly swingable retaining latch, said latch being disposed above and being releasably engageable with said plate portion and, when engaged with said plate portion serving to press the trigger down to a position which keeps the switch means closed and the flashlight on so long as the latch is in plate-engaging-position.

3. A night ice fishing device comprising a vertically elongated tubular barrel, said barrel being provided at its lower end with a pointed anchoring prong adapted to be driven and anchored in the ice to support the barrel in a perpendicular fishing position, said barrel being provided exteriorly with longitudinally spaced cleats to facilitate winding and storing a portion of a fishing line thereon, a flashlight incorporated in the upper end of said barrel and including a lamp in axial alignment with and projecting above said upper end, circuit make and break means mounted in said barrel and providing an illuminable signal, a trigger hingedly mounted on said barrel and having a portion engageable with the circuit make and break means to turn the flashlight on and off, and said trigger having an outer end portion defining a hook, said hook being designed to accommodate a releasably connected portion of said fishing line, a hand grip encasing the upper portion of said barrel, and a collar surrounding the upper end of said hand grip, said collar being provided with an upstanding off-center arm and said arm being provided with a laterally positioned reflector which is opposed to the adjacent end portion of the lamp in a manner to cooperate with the lamp in spreading light rays in the direction of the hand grip and also downwardly and upon the ice and an adjacent fishing hole in the ice.

References Cited in the file of this patent

UNITED STATES PATENTS

| | | |
|---|---|---|
| 2,349,077 | Comparelli | May 16, 1944 |
| 2,654,338 | Deal | Oct. 6, 1953 |

FOREIGN PATENTS

| | | |
|---|---|---|
| 463,794 | Canada | Mar. 21, 1950 |